United States Patent [19]

Deboer et al.

[11] Patent Number: 5,032,254
[45] Date of Patent: Jul. 16, 1991

[54] LITTER BOX CLEANING APPARATUS AND METHOD THEREFOR

[76] Inventors: Kenneth R. Deboer; Mary Deboer, both of Rte. 4, Box 192, Eldon, Mo. 65026

[21] Appl. No.: 548,567

[22] Filed: Jul. 5, 1990

[51] Int. Cl.⁵ .................... B07B 1/00; A01K 29/00
[52] U.S. Cl. ..................... 209/10; 119/161; 119/166; 209/235; 209/260; 209/348; 209/374; 209/420
[58] Field of Search ............... 209/10, 233, 235, 240; 209/252, 255, 259, 260, 346, 348, 370, 373, 374, 412, 420, 935; 119/161, 165, 166, 173

[56] References Cited

U.S. PATENT DOCUMENTS

| | | | |
|---|---|---|---|
| 75,043 | 3/1868 | Morrison | 209/374 |
| 566,630 | 8/1896 | Smith | 209/374 |
| 892,952 | 7/1908 | Froese | 209/10 |
| 1,041,017 | 10/1912 | Calder | 209/260 X |
| 3,482,546 | 12/1969 | Anderson | 119/166 |
| 4,030,449 | 6/1977 | Ruddick et al. | 119/166 |
| 4,190,525 | 2/1980 | Menzel | 209/235 |
| 4,205,624 | 6/1980 | Yacus | 209/10 X |
| 4,493,288 | 1/1985 | van der Kolk | 119/166 X |
| 4,667,622 | 5/1987 | Breault | 119/165 |
| 4,802,442 | 2/1989 | Wilson | 119/166 |

FOREIGN PATENT DOCUMENTS

| | | | |
|---|---|---|---|
| 2561066 | 9/1985 | France | 119/165 |
| 0588039 | 5/1947 | United Kingdom | 209/420 |

*Primary Examiner*—Kevin P. Shaver
*Assistant Examiner*—Edward M. Wacyra
*Attorney, Agent, or Firm*—Richard C. Litman

[57] ABSTRACT

A litter cleaning apparatus that has a large new litter receptacle, a waste receptacle and a cleaned and reclaimed litter receptacle. Brand new, or recycled, litter is introduced into the new litter receptacle and is opened at the bottom to release litter into a litter pan when necessary or when used litter is seen to be uncleanable. Used, soiled litter is taken from litter boxes and poured over a separator screen. Cleaned litter will fall through while waste can be dumped off the screen into the adjacent waste receptacle. The cleaned litter receptacle can be emptied from the bottom in order to fill litter pans individually or to empty the litter directly into a recycling bucket. The apparatus can be wheeled about from area or area on a large animal raising installation.

7 Claims, 2 Drawing Sheets

LITTER BOX CLEANING APPARATUS AND METHOD THEREFOR

BACKGROUND OF THE INVENTION

This invention relates generally to an apparatus and method for the cleaning and recycling of particulate animal waste collection material and more particularly to an improved litter box cleaning apparatus and method of cleaning litter boxes.

FIELD OF THE INVENTION

In the field of animal raising and breeding, a great amount of time and energy is spent on the task of cleaning the animal cages of waste material. The processes used are time consuming, expensive and costly, due to the manual labor involved and in the lack of recycling of materials.

The importance of maintaining a sanitary environment for the animals cannot be over-emphasized. One diseased or infected animal can cause a spread of bacteria that can infect the entire animal community. For people involved in the business of breeding and selling animals, having a diseased stock is equivalent to having no stock at all. A diseased animal is not a desirable consumer product.

The materials used in animal breeding, to collect and retain the animal waste, become prohibitively expensive unless proper recycling is employed. One method presently being used, is to manually scoop out the waste from the waste collection boxes, commonly referred to as litter boxes. The person using this method must selectively remove the isolated solid waste particles, as well as the fluid wastes. When one tries to remove, or scoop out, the fluid waste it breaks apart and crumbles, thereby contaminating a larger portion of the waste collection material (i.e. cat litter). This method, which attempts to remove only the waste, actually further contaminates the waste collection material, resulting in a partially cleaned waste collection box being returned to the animals living environment.

Therefore, a need has arisen for a safe, economical and efficient way to maintain a high level of sanitation for animals, while incorporating the recycling of material used in the process of collecting the animal waste.

DESCRIPTION OF THE PRIOR ART

Numerous methods and devices have been disclosed which describe animal litter cleaning systems. Some of these are described below.

U.S. Pat. No. 4,190,525 issued to Menzel discloses a receptacle unit for handling a quantity of cat litter comprising a screen to sift refuse from the litter. The screen may be either mechanically movable through the litter bed or the litter bed may be movable by gravity through the stationary screen.

U.S. Pat. No. 4,493,288 issued to Van der Kolk describes a device for continuously cleaning the litter in a litter box by removing used litter automatically as the animal uses the litter box. The device includes a hopper containing a store of unused litter, a litter box having a downward sloping conveyor mechanism forming the bottom of the box and a container which collects used litter and excrement.

U.S. Pat. No. 4,802,442 to Wilson discloses a cat litter screening device which comprises two planar bottom panels having a plurality of openings to permit the passage therethrough of the litter while occluding passage of a substantial portion of waste matter.

None of the above devices provides a complete system for processing large quantities of animal litter for separation at a separate work station, such as would be used in a large scale animal raising unit for cats, mink, etc. Such a work station can be transported through a facility and can separate the litter and waste from each individual litter box, while maintaining a highly sanitary environment and recycling the maximum amount of materials.

SUMMARY OF THE INVENTION

By the present invention an improved method and mobile apparatus for the cleaning of various types of particulate waste collection material, commonly referred to as cat litter, that maintains a high level of recycling and sanitation is provided. In the care and raising of animals, specifically cats, it is very important to keep the same litter box in the same animal pen. This is to stop the possible spread of diseases and isolate any bacteria until it can be discovered and neutralized. The apparatus used is preferably made of aluminum or steel and contains three funnel like reservoirs, various work supporting surfaces and wheels to allow for easy transportation of the device.

The apparatus has a top reservoir that is used to contain and dispense clean litter. Directly below this top reservoir is a rectangular work surface. This work surface is used to keep the various tools and chemicals used during the cleaning process readily at hand, and to support litter boxes while new or clean litter is supplied from the upper reservoir. Directly to the left is the hingeably attached ¼ inch screen. This screen is used to filter the waste from the reusable litter. Directly below this screen is a funnel type recycling reservoir, which serves a dual purpose. As litter is sifted through the screen it is contained within this recycling reservoir, and can be discharged into the same litter box that it was emptied from or into a recycling bucket.

Waste material, trapped on top of the screen, is directed to the waste discharge funnel, located directly behind the screen. By lifting the forward edge of the screen, the waste will fall down the screen into the waste discharge funnel and into a waste bucket container. This completes the cleaning process, and the litter box can now be sprayed with a disinfectant and returned to the animal's pen.

Accordingly, it is an object of the present invention to provide a litter cleaning device that allows for separation of large quantities of animal litter and waste at the same station.

It is one object of the present invention to provide a litter cleaning device that has separate receptacles for brand new clean litter, cleaned used litter and waste material.

It is another object of the present invention to provide a litter cleaning device in which the separate receptacles can be individually filled and emptied, such that cleaned litter can be placed back into a litter box or into a recycling container, waste can be removed, and brand new clean litter can be used to fill a litter pan.

It is a further object of the present invention to provide a litter cleaning device which can be moved easily about an animal raising facility in order to reach all cages.

It is additional object of the present invention to provide a litter cleaning device that provides a frame for each separate container and that provides lower storage racks for buckets and litter pans.

A still further object of the present invention is to provide a litter and waste separation device that maintains a high level of sanitation by facilitating the replacement of the same waste collection box to the corresponding animal pen.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

Similar reference characters denote corresponding features consistently throughout the attached drawings.

A DETAILED DESCRIPTION OF THE PREFERRED EMBODIMENT

Figure 1:
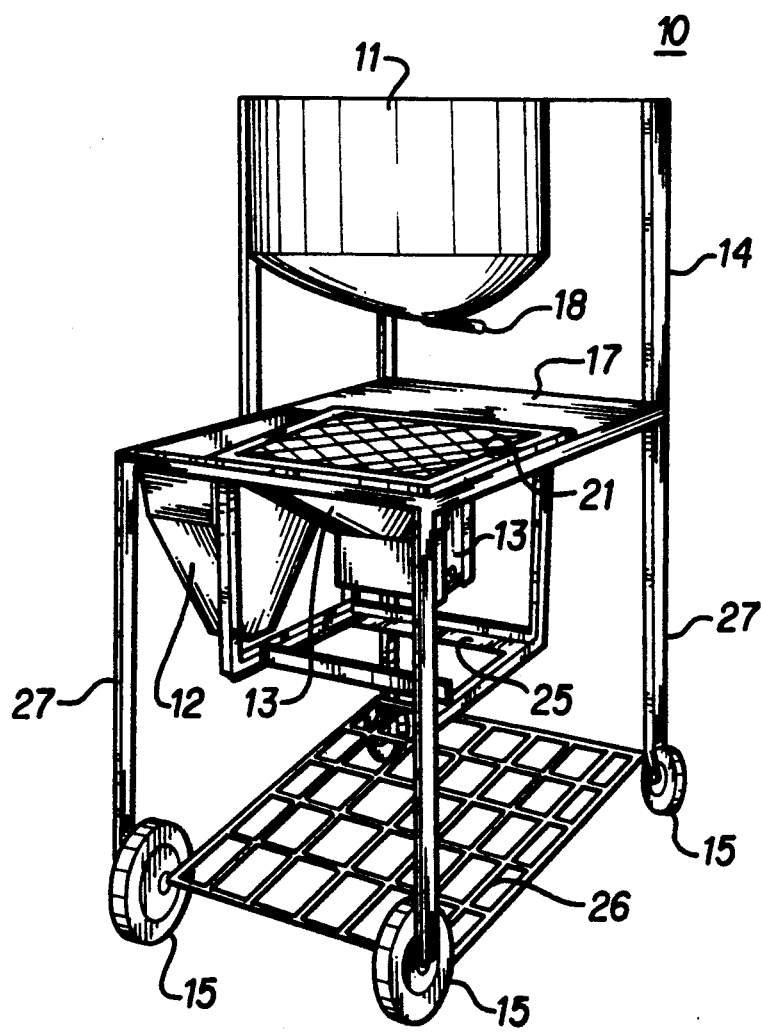
FIG. 1 is a perspective view of the present invention showing the three separate receptacles and the lower holding racks.
Figure 2:
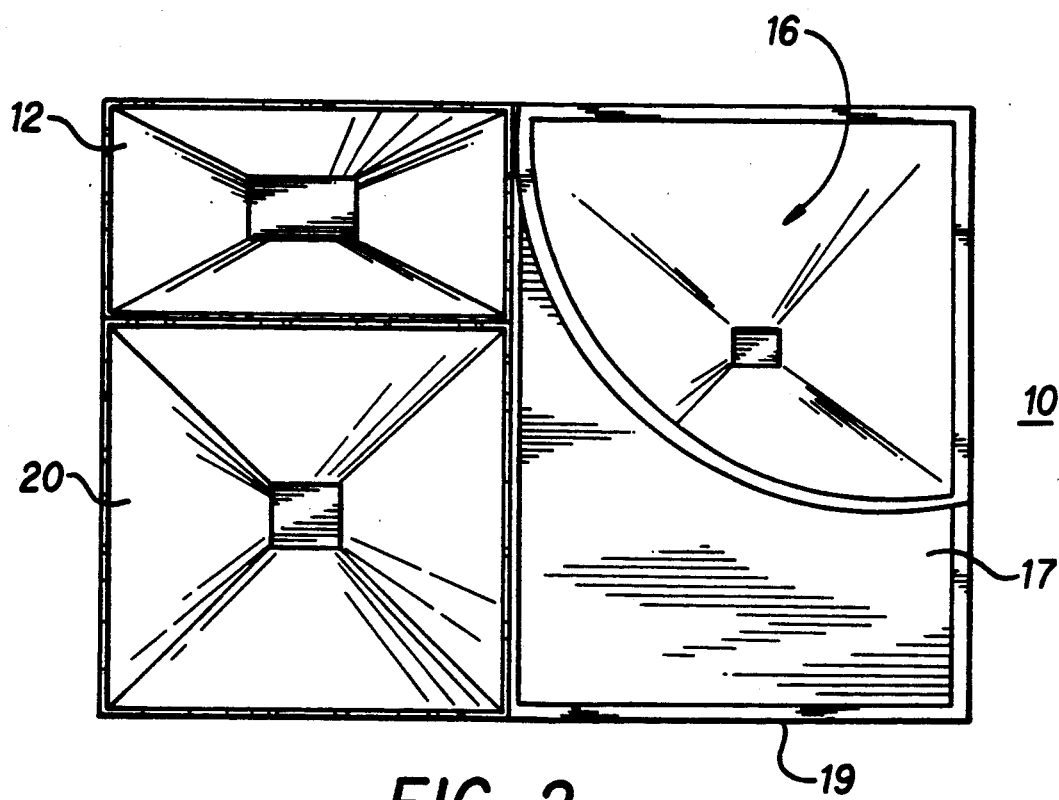
FIG. 2 is a top view of the present invention showing the interiors of the various receptacles.

Referring now to the drawings, particularly FIG. 1, the present invention will be understood to comprise a method and apparatus for cleaning and recycling the litter used in animal raising facilities. The apparatus 10 includes the new or recycled litter receptacle 11, the waste receptacle funnel 12 and the cleaned litter receptacle 13. The various receptacles are mounted to the frame of a cart 14 that has wheels 15 so that the whole cleaning unit 10 can be easily moved around by the person or team of people doing the animal litter cleaning. The large receptacle 11 for new or recycled litter is mounted above the other two receptacles 12, 13. The top 16 of the new or recycled litter receptacle, referring to FIG. 2, is open so that new animal litter from animal litter sacks, or recycled litter can be poured into the receptacle 11. If it is found that the cleaned old litter is not suitable for reuse, a litter pan 2 can be filled with new litter from the receptacle 11 and can be placed back in the same animal's cage.

Figure 3:
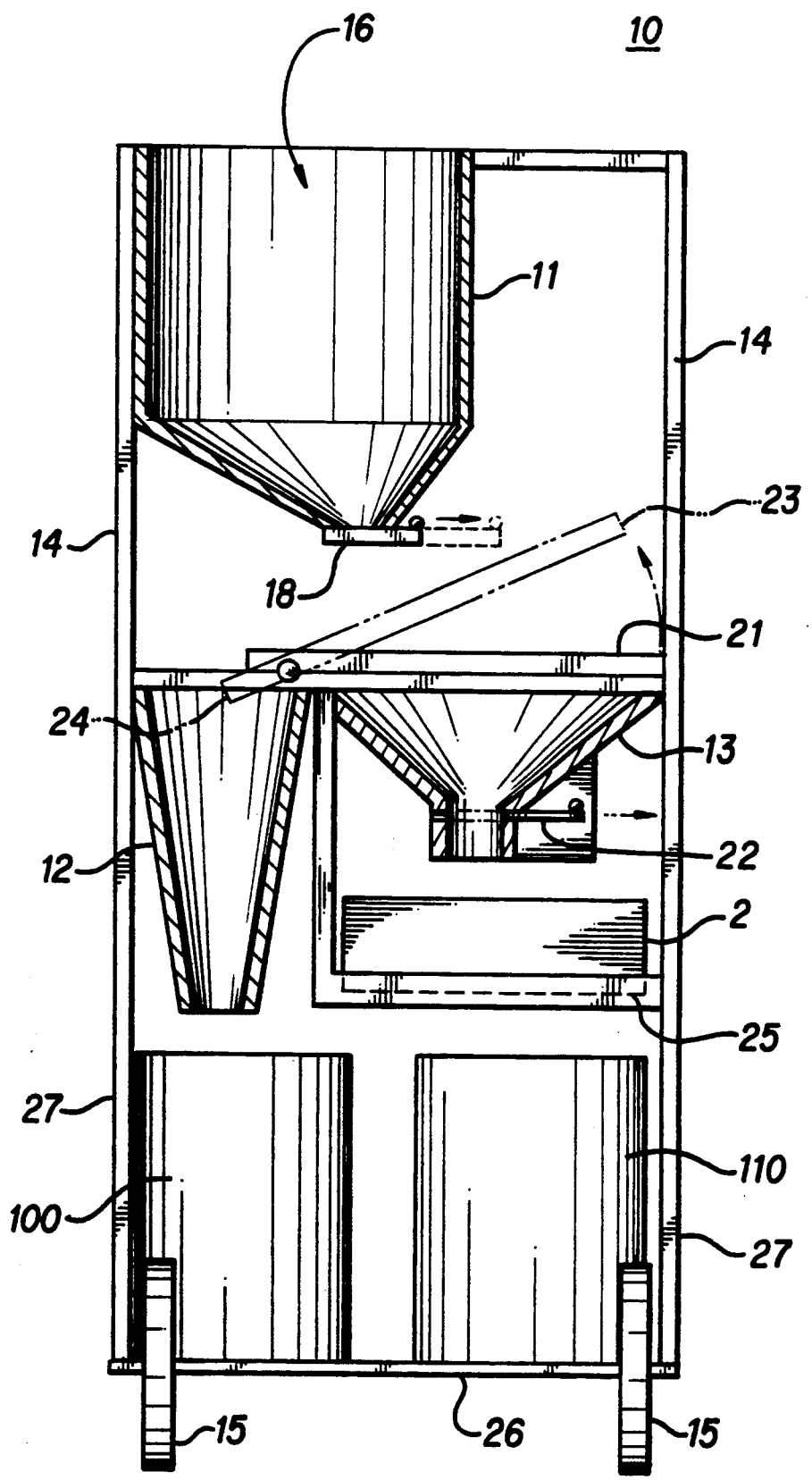
FIG. 3 is a side view, partly in section, of the present invention illustrating the various hatches for emptying the receptacles.

Disposed beneath the new or recycled litter receptacle 11 is a flat workbench 17. A sliding hatch or door 18, referring to FIG. 3, on the bottom of the receptacle 11 empties litter into a litter pan 2 sitting atop the workbench 17 when the bottom door 18 is opened. The workbench is formed from a sheet of 1/16" Aluminum that sits on an inner flange of surrounding frame 19 which is comprised of angle irons. It can be removed from the cart and cleaning assembly 10 for cleaning when necessary.

Next to the workbench are the two other receptacles 12, 13. The receptacle 13 for cleaned litter has a wide surface area at its top portion 20. This large top surface area 20 allows the maximum amount of litter to be separated and to fall through the separation screen 21 that sits atop the receptacle 13. The separation screen 21 is a flat panel of approximately ¼" wire mesh that is removable in a similar manner to the workbench 17 next to it. Over repeated usage, the screen 21 would also need to be cleaned. The purpose of the screen is to separate waste feces from the reusable litter.

In operation of the device, a litter box is removed from the animal's pen and the contents thereof are emptied onto the screen. The fluid wastes will be stuck to the litter box, so manual scraping must be employed to loosen the hardened fluid waste. This fluid waste is then directly discharged into the waste funnel 12. The litter box 2 is now placed beneath the recycling bin 13 on support 25. The forward end of the screen 23 is then lifted and shaken in a rapid up and down motion by the user. This forces the clean, uncontaminated litter to sift through the screen 21 and accumulate in reservoir 13. The solid wastes will be retained by screen 21. After the litter has been sifted, the screen is lifted almost to a vertical orientation and the solid wastes are dropped into waste funnel 12, over the waste discharge end 24 of screen 21. As the wastes fall down the funnel 12 they are discharged into the waste bucket 100 located directly beneath the waste funnel 12.

The sifted litter, retained by door 22, can be discharged back into the litter box 2 or can be emptied into recycling bucket 110. If the litter is in good condition it can be put back into litter box 2. If additional amounts of litter are required, the litter box 2 is placed under top reservoir discharge 18 and new or recycled litter is added to the litter box. When the litter is not suitable for reuse, it is discharged into recycle bucket 110. The litter in the recycle bucket 110 is then taken outside, rinsed, washed, disinfected and sun dried a number of times until it is thoroughly cleansed and suitable for reuse. This recycled litter can then be placed in top reservoir 11.

After the litter box 2 has been cleaned and refilled, it can be sprayed with a disinfectant and is placed back into the same animal's cage that it was removed from. This is an important point to emphasize—the same litter box must be returned to the same cage that it was removed from. This is to prevent the spread of disease and bacteria.

Waste funnel 12 is a delivery chute for depositing dumped waste material into an underlying bucket 100. Its shape, which is very steep and vertical, quickly delivers all waste to the bucket 100. Bucket 100 can then be replaced when it fills up with waste as the process continues. The separated waste can then be disposed of by using the usual garbage handling facilities. The buckets sit upon a lower main rack 26 which comprises a metal grid spread between the four individual legs 27 of the frame 14. Litter pans 2 can also be stored on this rack 26 as can any other necessary equipment such as cleaning solutions and sponges. A secondary rack 25 for holding litter pans 2 is mounted just below the clean litter receptacle 13. As with the screen 21 and the workbench 17 mountings, the litter pan rack 25 comprises angle irons that serve to retain the outward flanges of a standard litter pan 2.

All metal components are used for the cart frame 14 including metal tubing for the legs 27 and angle sections for holding the screen 21, the litter pan 2 and the workbench 17. All of the components can be welded together as is conventional when dealing with such materials.

It is to be understood that the present invention is not limited to the sole embodiment described above, but encompasses any and all embodiments within the scope of the following claims.

We claim:
1. A litter cleaning apparatus including:
   a frame;

a first receptacle for new or recycled litter disposed on an upper portion of said frame;

a second receptacle for cleaned litter disposed on said frame below said first receptacle;

a screen pivotally disposed atop said second receptacle;

a third receptacle for waste trapped by said screen adjacent said second receptacle; whereby new or recycled litter is introduced into and stored within said first receptacle, uncleaned litter is separately removed from a litter pan and placed on top of said screen such that particulate matter in said uncleaned litter falls through said screen into said second receptacle and trapped waste material is then directed into said third receptacle.

2. The litter cleaning apparatus according to claim 1, including:

openable hatch means disposed on the bottom portions of said first receptacle and said second receptacle.

3. The litter cleaning apparatus according to claim 2, including:

a litter pan rack mounted to said frame directly below said second receptacle, said litter pan rack allowing litter pans to be filled with the cleaned litter.

4. The litter cleaning apparatus according to claim 3 further comprising:

said litter pan rack defining an internal opening;

said internal opening allowing the passage of cleaned litter from the second receptacle to an underlying recycling bucket when a litter pan is not placed on said litter pan rack.

5. The litter cleaning apparatus according to claim 3, including:

a bucket rack disposed on said frame below said litter pan rack for holding buckets and similar receptacles beneath said second and third receptacles for cleaned litter and waste respectively.

6. The litter cleaning apparatus according to claim 1, wherein:

said screen is removably mounted over said second receptacle for cleaned litter.

7. A method for cleaning an animal waste receiving and containing device comprised of:

removing a litter pan from an animal's pen;

emptying the contents of said litter pan onto a screen pivotally attached above a cleaned litter receptacle;

scraping any residual material from said litter pan and emptying said residual material into a waste receiving funnel;

placing said litter pan on a litter pan rack underneath said cleaned litter receptacle;

shaking said screen until the contents of said litter pan has sifted through said screen and waste material is trapped above said screen;

lifting one end of said screen to force said waste material to fall into said waste receiving funnel;

emptying the contents of said cleaned litter receptacle into said litter pan;

removing said litter pan from said litter pan rack;

spraying said litter pan and the contents thereof with a disinfectant;

returning said litter pan to said animal's pen.

* * * * *